United States Patent
Gao

(10) Patent No.: US 10,445,866 B2
(45) Date of Patent: Oct. 15, 2019

(54) IMAGE PROCESSING METHOD AND DEVICE, EQUIPMENT AND COMPUTER STORAGE MEDIUM

(71) Applicant: TENCENT TECHNOLOGY (SHENZHEN) COMPANY LIMITED, Shenzhen (CN)

(72) Inventor: Xiaoyu Gao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 205 days.

(21) Appl. No.: 15/636,407

(22) Filed: Jun. 28, 2017

(65) Prior Publication Data
US 2017/0301073 A1    Oct. 19, 2017

Related U.S. Application Data

(63) Continuation of application No. PCT/CN2016/079607, filed on Apr. 18, 2016.

(30) Foreign Application Priority Data

Apr. 28, 2015    (CN) .......................... 2015 1 0208631

(51) Int. Cl.
*G06T 5/20* (2006.01)
*G06T 7/70* (2017.01)
(Continued)

(52) U.S. Cl.
CPC .............. *G06T 5/20* (2013.01); *G06F 1/1686* (2013.01); *G06F 3/011* (2013.01);
(Continued)

(58) Field of Classification Search
CPC ... G06T 5/20; G06T 7/70; G06T 5/009; G06F 1/1686; G06F 3/011; G06F 3/04842;
(Continued)

(56) References Cited

U.S. PATENT DOCUMENTS 9,225,897 B1 * 12/2015 Sehn .................. H04N 5/23222
2003/0072562 A1 * 4/2003 Vau .................... H04N 1/00127
386/240
(Continued)

FOREIGN PATENT DOCUMENTS

CN 103533241 A * 1/2014
CN 103533241 A    1/2014
(Continued)

OTHER PUBLICATIONS

International Search Report in international application No. PCT/CN2016/079607, dated Jul. 22, 2016.
(Continued)

*Primary Examiner* — Jonathan S Lee
(74) *Attorney, Agent, or Firm* — Syncoda LLC; Feng Ma

(57) ABSTRACT

An image processing method includes that: a first instruction of adding a filter to a target image is obtained; information of an environment where an electronic device is positioned is obtained, and a value of a first parameter is obtained on the basis of the information of the environment; a first preset mapping between different values of the first parameter and different values of a filter parameter is searched for a value of the filter parameter matched with the value of the first parameter; and filter addition is performed on the target image on the basis of the searched out value of the filter parameter. An image processing device, electronic device and a computer storage medium are also provided.

17 Claims, 9 Drawing Sheets

(51) Int. Cl.
*G06F 3/0484* (2013.01)
*G06K 9/46* (2006.01)
*G06F 1/16* (2006.01)
*G06F 3/01* (2006.01)
*G06T 5/00* (2006.01)
*G06K 9/36* (2006.01)
*G10L 15/22* (2006.01)
*G10L 15/26* (2006.01)
*G10L 25/63* (2013.01)

(52) U.S. Cl.
CPC ...... *G06F 3/04842* (2013.01); *G06F 3/04845* (2013.01); *G06K 9/36* (2013.01); *G06K 9/4604* (2013.01); *G06T 5/009* (2013.01); *G06T 7/70* (2017.01); *G06F 2203/011* (2013.01); *G10L 15/22* (2013.01); *G10L 15/265* (2013.01); *G10L 25/63* (2013.01)

(58) Field of Classification Search
CPC ........... G06F 3/04845; G06F 2203/011; G06K 9/4604; G10L 15/22; G10L 15/265; G10L 25/63
USPC ....................................................... 382/261
See application file for complete search history.

(56) References Cited

U.S. PATENT DOCUMENTS

2006/0252530 A1* 11/2006 Oberberger ............. G07F 17/32 463/29
2006/0281064 A1* 12/2006 Sato ..................... G09B 23/286 434/308
2011/0211753 A1 9/2011 Lee

FOREIGN PATENT DOCUMENTS

CN 103595898 A 2/2014
CN 103927372 A 7/2014

OTHER PUBLICATIONS

English Translation of the Written Opinion of the International Search Authority in international application No. PCT/CN2016/079607, dated Jul. 22, 2016.

* cited by examiner

IMAGE PROCESSING METHOD AND DEVICE, EQUIPMENT AND COMPUTER STORAGE MEDIUM

CROSS-REFERENCE TO RELATED APPLICATIONS

This is a continuation application of International Patent Application No. PCT/CN2016/079607, filed on Apr. 18, 2016, which claims priority to Chinese Patent Application No. 201510208631.7 filed on Apr. 28, 2015. The disclosures of these applications are incorporated by reference herein in their entirety.

BACKGROUND

Some of existing image processing tools have a filter function. The filter function mainly achieves various special effects on an image by changing a parameter such as a tone, saturation and brightness of the image. While the existing image processing tools require users to manually add a filter to an image and may not implement automatic addition, which brings inconvenience to operations by the user. In addition, the existing image processing tools also do not have a function of providing a filter adapted to an environment where the user is positioned, and the user is usually required to screen a large number of filters to be selected one by one, so that it is complicated to operate.

SUMMARY

The disclosure relates to the field of image processing, and more particularly to an image processing method and device, electronic device and a computer storage medium.

The embodiment of the disclosure provides an image processing method and device, electronic device and a computer storage medium, so as to automatically select an adapted filter according to an environment where a user is positioned and simplify image filter addition operation.

On a first aspect, the embodiment of the disclosure provides an image processing method, which may be applied to electronic device, the method including that:

a first instruction of adding a filter to a target image is obtained;

information of an environment, where the electronic device is positioned, is obtained, and a value of a first parameter is obtained on the basis of the information of the environment;

a first preset mapping between different values of the first parameter and different values of a filter parameter is searched for a value of the filter parameter matched with the value of the first parameter according to the value of the first parameter; and filter addition is performed on the target image on the basis of the searched out value of the filter parameter.

On a second aspect, the embodiment of the disclosure provides an electronic device, the device including:

a processor; and a memory for storing instructions executable by the processor, wherein the processor is configured to:

obtain a first instruction of adding a filter to a target image;

obtain information of an environment where the electronic device is positioned;

obtain a value of a first parameter on the basis of the information of the environment, and search, according to the value of the first parameter, a first mapping between different values of the first parameter and different values of a filter parameter for a value of the filter parameter matched with the value of the first parameter; and perform filter addition on the target image on the basis of the searched out value of the filter parameter.

On a third aspect, the embodiment of the disclosure provides a computer storage medium, in which executable instructions may be stored, the executable instructions being configured to execute an image processing method provided by the embodiment of the disclosure.

According to the image processing method and device provided by the embodiments of the disclosure, when a filter is added to an image to be processed, i.e. the target image, the information of the environment of the electronic device is obtained, the filter parameter adapted to the information of the environment to the greatest extent is selected for the target image, and the selected filter parameter is further configured to act on the target image, so that the obtained target image may be adapted to the environment where the electronic device is positioned to the greatest extent. In the embodiments of the disclosure, the filter is automatically added by the electronic device according to the information of the environment, and manual operation of a user is not required, so that filter addition operation over an image or a video may be simplified.

DETAILED DESCRIPTION

The technical solutions of the disclosure will be further elaborated below with reference to the drawings and specific embodiments in detail.

Figure 1:
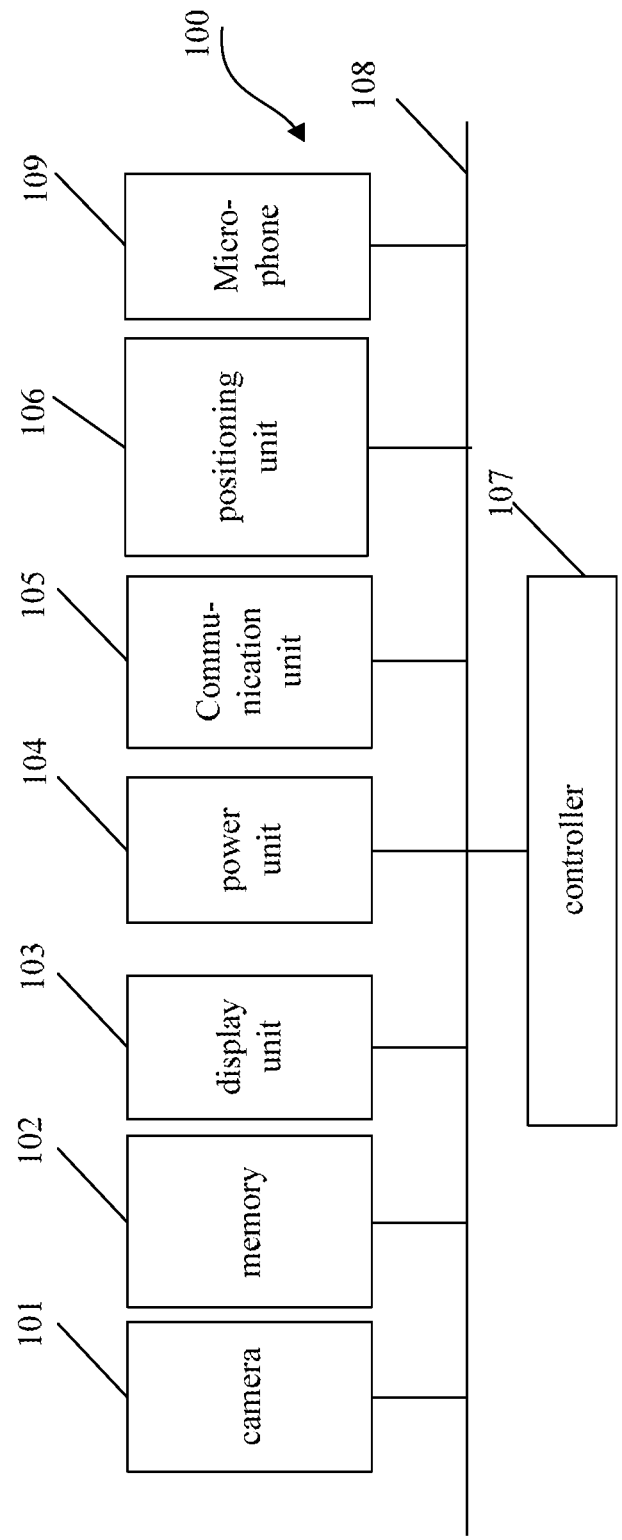
FIG. 1 is an optional hardware structure diagram of an electronic device according to an embodiment of the disclosure.

At first, referring to FIG. 1, an electronic device involved in each embodiment of the disclosure is described, the electronic device may be implemented in various forms, and for example, the electronic device recorded in the embodiment of the disclosure may include a smart phone, a notebook computer, a PAD, a Portable Multimedia Player (PMP) and a navigation device.

FIG. 1 is an optional hardware structure diagram of an electronic device 100 according to an embodiment of the disclosure. A camera 101 is configured to acquire a static image of an environment, or acquire a video formed by combining a series of frame images of the environment.

A memory 102 may adopt a storage medium in form of a flash memory or a hard disk, and is configured to store the image acquired by the camera 101 and store executable instructions for a processor 107 to read through a bus 108 to control the other components in the electronic device 100, for example, controlling the camera 101 to acquire the image, executing filter addition processing on the image and storing a processed image in the memory 102 according to an instruction of a user side.

The image acquired by the camera 101 may be displayed in a display unit 103, and an image obtained after a filter is added and an image obtained after the filter is switched may further be displayed.

A power unit 104 is configured to provide electric energy for the other components in the electronic device 100, and during a practical application, the power unit 104 may be implemented into various forms of storage batteries or power adapters.

A communication unit 105 is configured to perform mobile communication by adopting various communication systems, such as Code Division Multiple Access (CDMA), Wideband Code Division Multiple Access (WCDMA), Time Division-Synchronization Code Division Multiple Access (TD-SCDMA) and an evolved communication system, or, perform communication in a wireless Internet manner, for example, performing communication in a Wireless Fidelity (WiFi) manner.

A positioning unit 106 is configured to receive a satellite positioning signal (such as a Global Positioning System (GPS) signal of the United States and a Beidou positioning system signal of China), and output a positioning coordinate (such as a longitude and a latitude) of the electronic device 100.

In addition, during a practical application, other functional modules may further be implemented according to requirements of different application scenarios, and for example, a microphone 108 is configured to acquire voice information of the user side.

Figure 2:
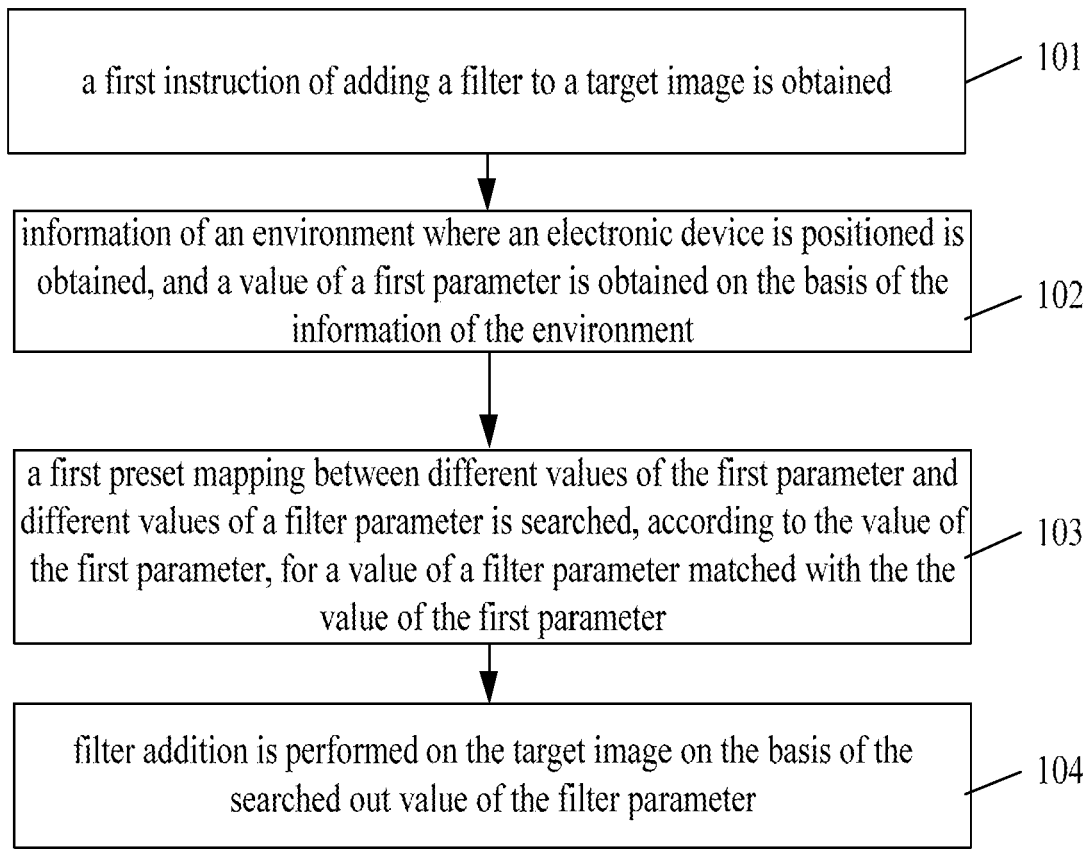
FIG. 2 is an optional flowchart of an image processing method according to an embodiment of the disclosure.

The embodiment of the disclosure provides an image processing method, which may be applied to the abovementioned electronic device, FIG. 2 is an optional implementation flowchart of an image processing method according to an embodiment of the disclosure, and the method includes the following steps.

Step 101: a first instruction of adding a filter to a target image is obtained.

The target image is an object to be processed indicated by a user side, or may be a static image acquired by the electronic device, or may be a frame image in a video acquired by the electronic device.

A user processes the image acquired by the electronic device (i.e. the target image) by virtue of an image processing tool installed in the electronic device, a function button on a corresponding operation interface of the image processing tool may be triggered if a filter is required to be added to the target image, and then the first instruction is obtained. For example, filter addition is performed on an image which has been stored in the electronic device (i.e. an image unrelated to a current environment) in response to the first instruction, or, filter addition is performed on an image shot by the electronic device in real time in the environment where the user is positioned in response to the first instruction.

Step 102: information of an environment where the electronic device is positioned is obtained, and a value of a first parameter is obtained on the basis of the information of the environment.

The information of the environment where the electronic device is positioned is obtained in response to the obtained first instruction, and the information of the environment where the electronic device is positioned will be described below with reference to different implementations.

In an implementation, the information of the environment where the electronic device is positioned may be information (called position information for short) of a current position of the electronic device in the environment, a granularity of an area represented by the position information may be set according to a practical requirement, and for example, the granularity of the area represented by the position information may be a city, an urban area in the city, a certain street in the urban area or a certain building in the urban area. The first parameter may be at least one of the following information of the position (indicated by the position information) of the electronic device in the environment: season, weather and time, in which the season refers to a current season (including spring, summer, autumn and winter) of the geographical position of the electronic device, the time refers to current time of the geographical position of the electronic device, and the time may be a specific moment, or may be a time interval such as a morning, a noon, an afternoon, a nightfall and an evening. The weather refers to weather of the geographical position of the electronic device, such as sunny, cloudy, rainy, snowy, windy, foggy and hazy, and may further include temperature, humidity, visibility and the like.

The abovementioned implementation is continued to be described, and when the information of the environment is the position information of the electronic device in the environment, the step that the value of the first parameter is obtained may be implemented in two manners as follows.

Acquisition manner 1): a server is requested for the value of at least one of the first parameter: the season, the weather and the time, related to the position information on the basis of the position information of the electronic device in the environment. For example, the electronic device receives a positioning coordinate output by a GPS signal to identify the position information of the electronic device in the environment through a positioning unit 106, or, queries and obtains the position information in the environment from the server on the basis of the positioning coordinate.

Acquisition manner 2): the electronic device performs voice recognition processing on acquired voice information (from the user side and configured to indicate the position information) of the user side to obtain the position information in the environment, converts the voice information into text information, and extracts the position information from the text information. The server is requested for the value of at least one of the following first parameter related to the position information: the season, the weather and the time. The voice information may be acquired by a microphone of the electronic device, and is obtained by voice recognition processing of a controller 107 in the electronic device over the voice information.

In another implementation, the information of the environment where the electronic device is positioned may be voice information which is acquired by the electronic device and represents an emotional state of a user, and the first parameter may be an emotional state, obtained by performing voice recognition processing on the voice information, of the user. In the case that the first parameter is an emotional state, the first parameter may have different values, each representing one of various emotional states, for example, happy or sad.

The abovementioned implementation is continued to be described, and the step that the value of the first parameter is obtained may be implemented in a manner as follows. Voice recognition processing is performed on the voice information acquired by the electronic device to obtain text information corresponding to the voice information, emotional state information (such as happy and sad) of the user is extracted from the text information, and the voice information may be acquired by the microphone of the electronic device, and is obtained by voice recognition processing of the controller 107 in the electronic device over the voice information.

Step 103: a first preset mapping between different values of the first parameter and different values of a filter parameter is searched, according to the value of the first parameter, for a value of the filter parameter matched with the value of the first parameter.

The implementation in Step 102 where the information of the environment where the electronic device is positioned in Step 102 is the position information of the electronic device in the environment and the first parameter is at least one of the season, the weather and the time is continued to be described.

A mapping, i.e. the first mapping, between different values of the first parameter and the different values of a filter parameter is pre-stored in the electronic device, and in the first mapping, the different values of the first parameter correspond to the different value of the filter parameter, in which the filter parameter is at least one of: toner, saturation, brightness and contrast; and then, Step 103 is implemented in a manner as follows: the first preset mapping is searched for a value of a filter parameter, including at least one of the toner, the saturation, the brightness and the contrast, matched with at least one of the season, the weather and the time according to the obtained value of the first parameter (including at least one of the season, the weather and the time) related to the position information. The first parameter may include one or more first parameters and each first parameter may have one or more values. In an example, each value of a single first parameter corresponds to a respective value of each of one or more filter parameters. In the case of multiple first parameters, the multiple first parameters may have one or more set of values, each set of values may correspond to a respective value of each of one or more filter parameters.

The implementation in Step 102 where the information of the environment is the voice information acquired by the electronic device and the first parameter is the emotional state, represented by the voice information, of the user is continued to be described.

The first mapping between different values of the first parameter and different values of the filter parameter is pre-stored in the electronic device, that is, first parameter representing different emotional states respectively correspond to the different values of the filter parameter. The filter parameter is at least one of: toner, saturation, brightness and contrast; and then, Step 103 is implemented in a manner as follows: the emotional state of the user is extracted from the text information according to the obtained text information corresponding to the acquired voice information, and the first preset mapping is searched for a value of a filter parameter matched with the extracted emotional state of the user, the filter parameter including at least one of the toner, the saturation, the brightness and the contrast.

Step 104: filter addition is performed on the target image on the basis of the searched out value of the filter parameter.

After Step 103 is executed to search for the value of the filter parameter, the electronic device may act on the obtained target image on the basis of the searched out filter parameter, thereby finishing adjusting the toner, saturation, brightness and/or contrast of the target image and displaying and storing the target image of which the toner, saturation, brightness and/or contrast are/is adjusted.

The implementation in Step 103 where the information of the environment where the electronic device is positioned is the position information of the electronic device in the environment and the first parameter is at least one of the season, the weather and the time is continued to be described. When the value of the filter parameter (including at least one of the toner, the saturation, the brightness and the contrast) matched with the value of the first parameter is obtained in Step 103, filter addition in Step 104 is implemented in a manner as follows: a value of a filter parameter of the target image is adjusted to be consistent with the value of the filter parameter (including at least one of the toner, the saturation, the brightness and the contrast) matched with the value of the first parameter.

The implementation in Step 103 where the information of the environment where the electronic device is positioned is the voice information which is acquired by the electronic device and represents the emotional state and the first parameter is the emotional state, obtained by performing voice recognition processing on the voice information, of the user is continued to be described. When the value of the filter parameter (including at least one of the toner, the saturation, the brightness and the contrast) matched with the emotional state is obtained in Step 103, filter addition in Step 104 may be implemented in a manner as follows: the value of the filter parameter of the target image is adjusted to be consistent with the value of the filter parameter (including at least one of the toner, the saturation, the brightness and the contrast) matched with the value of the first parameter.

It is noted that if the target image is a static image, filter addition on the target image refers to correspondingly adjusting the toner, saturation, brightness and/or contrast of the static image. Since a video is formed by a series of frame images, filter addition may further be applied to the frame images in the video, and toners, saturation, brightness and/or contrast of each frame image in the video are correspondingly adjusted.

Figure 3:
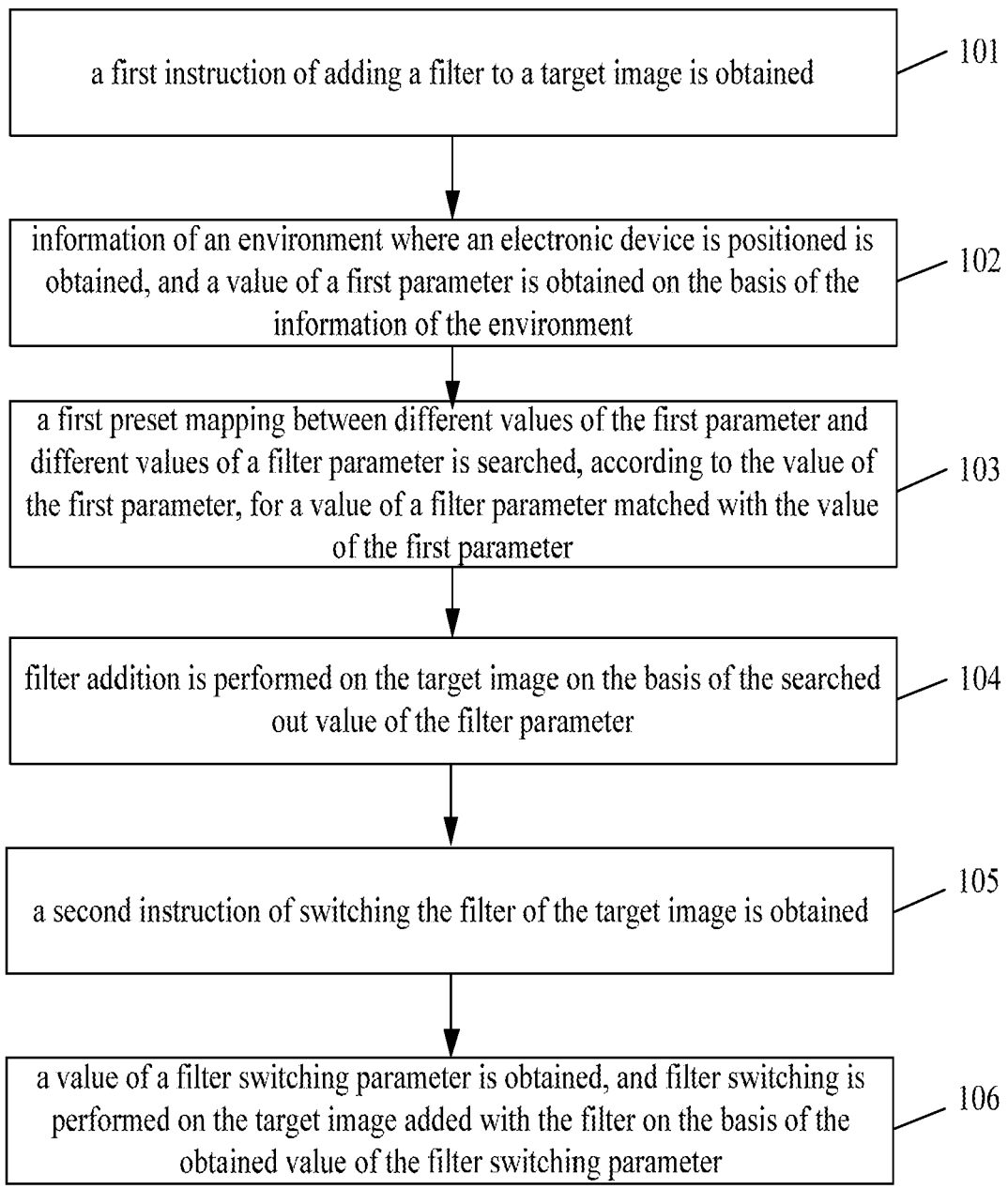
FIG. 3 is another optional flowchart of an image processing method according to an embodiment of the disclosure.

In another implementation of the disclosure, based on FIG. 2, FIG. 3 is an optional implementation flowchart of an image processing method according to an embodiment of the disclosure, and after filter addition is performed on the target image, the method further includes the following steps:

Step 105: a second instruction of switching the filter of the target image is obtained.

Step 106: a value of a filter switching parameter is obtained, and filter switching is performed on the target image added with the filter on the basis of the obtained value of the filter switching parameter.

That is, after the electronic device finishes performing filter addition on the target image according to the information of the environment, an effect is displayed to the user through a display unit of the electronic device; the user may select to store the target image subjected to filter addition, or of course, the user may readjust the target image subjected to filter addition; when the user is required to readjust the target image subjected to filter addition, the function button on the corresponding operation interface of the image processing tool is triggered, and then the electronic device obtains the second instruction, the second instruction being configured to indicate performing of filter switching on the target image; the electronic device obtains the value of the filter switching parameter in response to the second instruction, the filter switching parameter may be obtained by selecting a group from filter parameters pre-stored by the electronic device as filter switching parameters, or the user may input a group of filter switching parameters through the operation interface of the image processing tool; and after the value of the filter switching parameter is obtained, the electronic device may perform filter switching on the target image added with the filter on the basis of the obtained value of the filter switching parameter, that is, a target image obtained under the action of the filter switching parameter is finally displayed and/or stored by configuring the filter switching parameter to act on the target image.

Figure 4:
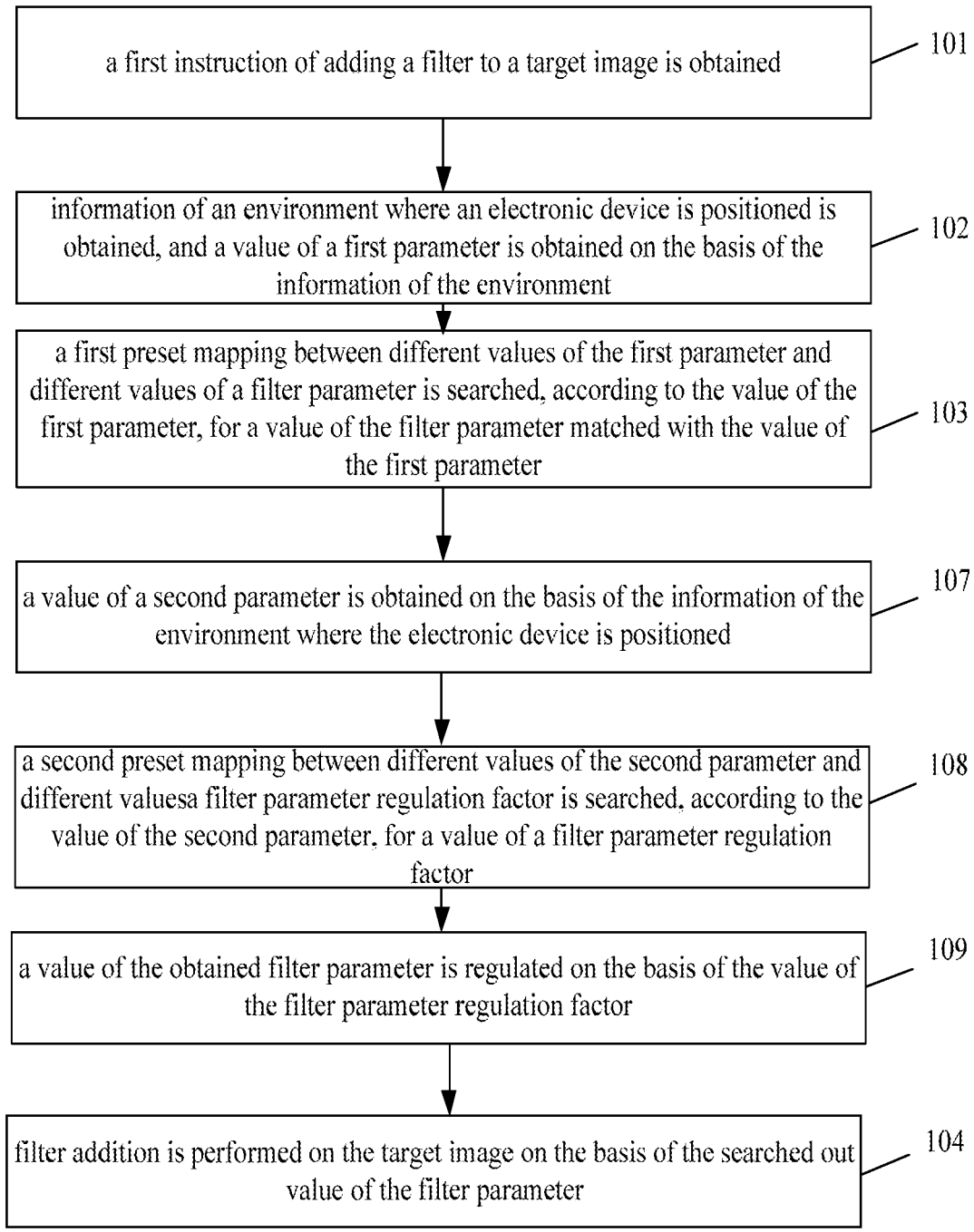
FIG. 4 is yet another optional flowchart of an image processing method according to an embodiment of the disclosure.

In another implementation of the disclosure, based on FIG. 2, FIG. 4 is an optional implementation flowchart of an image processing method according to an embodiment of the disclosure, and after the value of the filter parameter matched with the value of the first parameter is obtained, the method may further include the following steps:

Step 107: a value of a second parameter is obtained on the basis of the information of the environment where the electronic device is positioned;

Step 108: a second preset mapping between different values of a second parameter and different values of a filter parameter regulation factor is searched, according to the value of the second parameter, for a value of a filter parameter regulation factor; and Step 109: a value of the obtained value of the filter parameter is adjusted on the basis of the searched out value of the filter parameter regulation factor.

Then, the operation that filter addition is performed on the target image on the basis of the obtained value of the filter parameter in Step 104 is implemented in a manner as follows: filter addition is performed on the target image on the basis of the adjusted value of the filter parameter.

That is, after the filter parameter matched with the first parameter is obtained, the second preset mapping relationship may further be searched to obtain the filter parameter regulation factor according to the second parameter corresponding to the information of the environment where the electronic device is positioned, the numerical value of the filter parameter is further readjusted by virtue of the obtained filter parameter regulation factor, and a target image obtained under the action of the filter parameter of which the numerical value is adjusted is finally displayed and/or stored under the action of the adjusted value of the filter parameter on the target image.

In the implementation in Step 102 where the information of the environment where the electronic device is positioned is the position information of the electronic device in the environment and the first parameter is at least one of the season, the weather and the time, a manner for obtaining the value of the filter parameter regulation factor is described. Correspondingly, the second parameter may be at least one of the following information: a position of the sun, a position of the moon and the weather. The position of the sun/moon refers to the position of the sun/moon at the position of the electronic device, and the weather includes: 1) temperature of the position of the electronic device in the environment, and 2) intensities of various weather indexes at the position of the electronic device in the environment, such as: an ultraviolet intensity, a rainfall intensity, a snowfall intensity, a wind intensity and a fog/haze intensity; and the second mapping is a mapping between weather (including at least one of the position of the sun, the position of the moon, the temperature and the index intensities) and different values of a filter parameter regulation factor.

Then, Step 108 may be implemented in a manner as follows: the electronic device searches the second mapping for a value of a filter parameter regulation factor matched with the second parameter (namely matched with a value of the second parameter) according to the obtained value of the second parameter (including the position of the sun/moon, weather and the like related to the position information of the electronic device in the environment), including at least one of: a toner regulation factor, a saturation regulation factor, a brightness regulation factor and a contrast regulation factor.

In the implementation in Step 102 where the information of the environment where the electronic device is positioned is the voice information which is acquired by the electronic device and represents the emotional state and the first parameter is the emotional state, obtained by performing voice recognition processing on the voice information, of the user, the manner for obtaining the value of the filter parameter regulation factor is described; the value of the second parameter may be a decibel level of the voice information; and the second mapping is a mapping between decibel levels of voice information and values of the filter parameter regulation factor.

Then, Step 108 is implemented in a manner as follows: the electronic device searches the second mapping for a value of a filter parameter regulation factor matched with the decibel level of the voice information according to the obtained decibel level of the voice information, including at least one of: a toner regulation factor, a saturation regulation factor, a brightness regulation factor and a contrast regulation factor.

The filter parameter regulation factor acts on the target image after the value thereof being adjusted, so that the display effect of the target image may be more consistent with a characteristic of the environment where user is positioned, and a current emotional state of the user may be represented more accurately.

Figure 5:
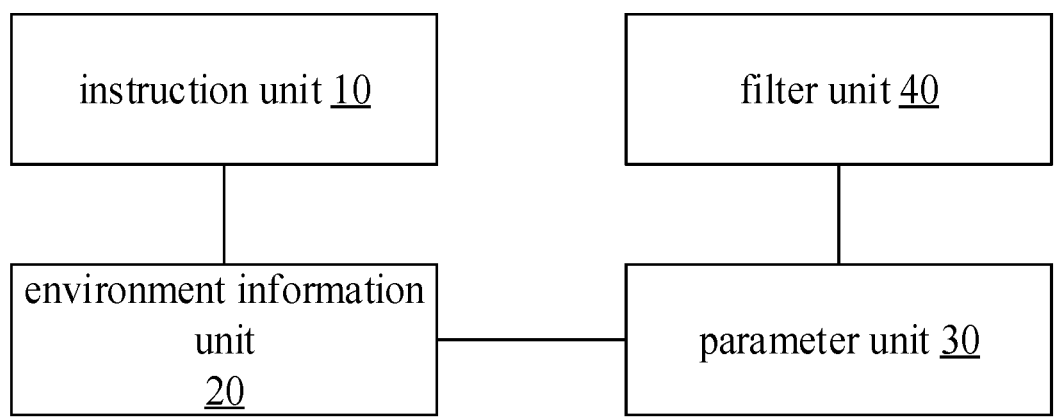
FIG. 5 is an optional structure diagram of an image processing device according to an embodiment of the disclosure.

The embodiment of the disclosure provides an image processing device, which is applied in an electronic device, FIG. 5 is an optional structure diagram of an image processing device, and it is noted that function units of the image processing device shown in FIG. 5 are only divided according to logic functions of the image processing device and more units may be divided or part of units may be combined into a unit during a practical application. The image processing device includes:

an instruction unit 10, configured to obtain a first instruction of adding a filter to a target image;

an environment information unit 20, configured to obtain information of an environment where the electronic device is positioned;

a parameter unit 30, configured to obtain a value of a first parameter on the basis of the information of the environment, and search, according to the value of the first parameter, a first preset mapping between different values of the first parameter and different values of a filter parameter for a value of the filter parameter matched with the value of the first parameter; and a filter unit 40, configured to perform filter addition on the target image on the basis of the searched out value of the filter parameter.

In an implementation, the instruction unit 10 is further configured to, after the filter unit 40 performs filter addition on the target image, obtain a second instruction of switching the filter of the target image;

the parameter unit 30 is further configured to obtain a value of a filter switching parameter; and the filter unit 40 is further configured to perform filter switching on the target image added with the filter on the basis of the obtained value of the filter switching parameter.

That is, after the filter unit 40 finishes performing filter addition on the target image according to the information of the environment, an effect may be displayed to a user through a display unit of the electronic device; the user may select to store the target image subjected to filter addition, or of course, the user may readjust the target image subjected to filter addition; when the user is required to readjust the target image subjected to filter addition, a function button on a corresponding operation interface of an image processing tool is triggered, and then the instruction unit 10 obtains the second instruction of switching the filter of the target image; the parameter unit 30 obtains the value of the filter switching parameter in response to the second instruction, the filter switching parameter may be obtained by selecting a group from filter parameters pre-stored by the electronic device as filter switching parameters, or the user may input a group of filter switching parameters through the operation interface of the image processing tool; and after the value of the filter switching parameter is obtained, the filter unit 40 may perform filter switching on the target image added with the filter on the basis of the obtained value of the filter switching parameter, that is, a target image obtained under the action of the filter switching parameter is finally displayed and/or stored by configuring the filter switching parameter to act on the target image.

In an implementation, the information of the environment where the electronic device is positioned may be current position information of the electronic device in the environment, and the first parameter may be at least one of the following information: season, weather and time. The season refers to a current season (spring, summer, autumn and winter) of the geographical position of the electronic device, the time refers to current time (such as a morning, a noon, an afternoon, a nightfall and an evening) of the geographical position of the electronic device, and the weather refers to weather (sunny, cloudy, rainy, snowy, windy, foggy and hazy) of the geographical position of the electronic device.

Then, the parameter unit 30 is further configured to request a server for the value of the first parameter related to the position information on the basis of the position information of the electronic device, including at least one of: the season, the weather and the time.

In another implementation, the information of the environment may be voice information, acquired by the electronic device in the environment, of the user, and the first parameter may be an emotional state, represented by the voice information, of the user; and then, the parameter unit 30 is further configured to perform voice recognition processing on the voice information to obtain text information corresponding to the voice information, and extract the emotional state of the user from the text information.

In the implementation where the information of the environment where the electronic device is positioned is the current position information of the electronic device in the environment and the first parameter is at least one of the season, the weather and the time, the filter parameter may be at least one of: toner, saturation, brightness and contrast; the parameter unit 30 is further configured to search the first mapping for a matched value of the filter parameter, including at least one of the toner, the saturation, the brightness and the contrast, according to the first parameter (including at least one of the season, the weather and the time) related to the position information; and the filter unit 40 is further configured to adjust a value of a filter parameter of the target image to be consistent with at least one of the matched toner, saturation, brightness and contrast.

In the implementation where the information of the environment where the electronic device is positioned is the voice information acquired by the electronic device and the first parameter is the emotional state of the user, the filter parameter may be at least one of: the toner, the saturation, the brightness and the contrast; the parameter unit 30 is further configured to search the first mapping for a matched value of the filter parameter, including the toner, the saturation, the brightness and the contrast, according to the value of the first parameter representing the emotional state of the user; and the filter unit 40 is further configured to adjust the value of the parameter of the target image to be consistent with the value of the matched filter parameter (including at least one of the toner, the saturation, the brightness and the contrast).

In an implementation, the parameter unit 30 is further configured to, after the value of the filter parameter matched with the value of the first parameter is obtained, obtain a value of a second parameter on the basis of the information of the environment where the electronic device is positioned, search a second preset mapping between different values of the second parameter and different value of a filter parameter regulation factor to obtain a value of the filter parameter regulation factor according to the value of the second parameter, and adjust a value of the obtained value of the filter parameter on the basis of the value of the filter parameter regulation factor; and the filter unit 40 is further configured to perform filter addition on the target image on the basis of the adjusted value of the filter parameter.

In the implementation where the information of the environment where the electronic device is positioned is the current position information of the electronic device in the environment and the first parameter is at least one of the season, the weather and the time, the second parameter may be at least one of the following information: a position of the sun/moon and the weather; the filter parameter regulation factor includes at least one of: toner, saturation, brightness and contrast regulation factors; and the parameter unit 30 is further configured to search the second mapping for a value of a matched filter parameter regulation factor (including at least one of: the toner, saturation, brightness and contrast regulation factors) according to the obtained value of the second parameter (including at least one of the position of the sun/moon and the weather) related to the position information.

In the implementation where the information of the environment where the electronic device is positioned is the voice information acquired by the electronic device and the first parameter is the emotional state of the user, the value of the second parameter may be a decibel level of the voice information; and the parameter unit 30 is further configured to search the second mapping for a filter parameter regulation factor (including at least one of: the toner, saturation, brightness and contrast regulation factors) matched with the decibel level according to the obtained decibel level of the voice information.

It is noted that the instruction unit 10, the environment information unit 20, the parameter unit 30 and the filter unit 40 may be implement by executing executable instructions of a memory 102 by a controller 107 in the electronic device, an involved image acquisition function may be realized by a camera 101, an involved function of communication with the server may be realized by a communication unit 105, involved position information acquisition may be implemented by a positioning unit 106, and an involved function of acquiring the voice information may be realized by a microphone 109.

From the above, when the filter is required to be added to the target image, the information of the environment of the electronic device is obtained, the filter parameter adapted to the information of the environment as much as possible is selected for the target image, and the selected filter parameter is further configured to act on the target image, so that the obtained target image may be adapted to the environment where the electronic device is positioned as much as possible; and in the embodiment of the disclosure, the filter is automatically added by the electronic device according to the information of the environment, and manual operation of the user is not required, so that filter addition operation over an image or a video may be simplified.

The image processing method of the embodiment of the disclosure will be described below with reference to application scenarios.

Application Scenario 1

Figure 6:
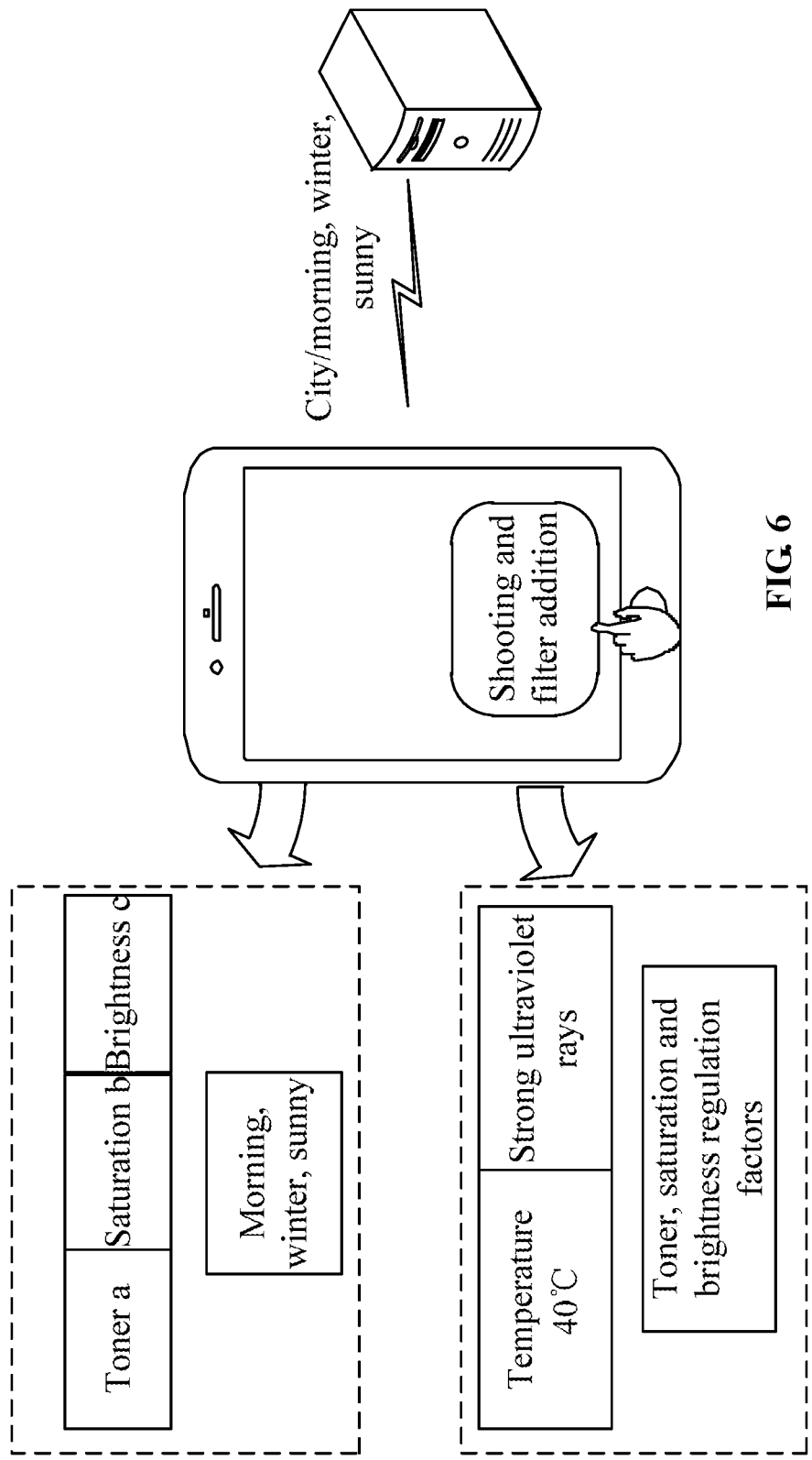
FIG. 6 is an optional application scenario diagram of an image processing method according to an embodiment of the disclosure.

In application scenario 1, when an electronic device adds a filter to a first obtained image, a value of a filter parameter adapted to position information is selected according to the current position information of the electronic device, and the selected filter parameter acts on the first image. A filter addition process is described as follows:

at first, the electronic device obtains a first instruction of adding the filter to the first image, the first instruction being generated by triggering a function button on a corresponding operation interface of an image processing tool by a user of the electronic device; the first image may be an image shot by a camera of the electronic device, or may be an image pre-stored in the electronic device; if the filter is to be added to the image shot by the camera, the first instruction may be obtained before the image is shot, or may be obtained after the image is shot, that is, the user may trigger generation of the first instruction before the image is shot, or may trigger generation of the first instruction after the image is shot;

after the first instruction is obtained, the electronic device obtains the current position information of the electronic device in an environment on the basis of own GPS function, and the position information may be information of a city where the electronic device is currently positioned;

after the information of the city where the electronic device is currently positioned is obtained, referring to FIG. 6, the electronic device requests a server for time, season and weather of the corresponding city, and it is supposed that the obtained time is 9 A.M. on April first, 2010, the season is winter and the weather is sunny; or, of course, if the electronic device has stored the time, season and weather of the corresponding city, the electronic device may not be required to obtain them from the server, and instead, may directly extract the stored time, season and weather of the corresponding city;

after the time, season and weather of the city where the electronic device is positioned are obtained, the electronic device may search a first mapping for a value of a matched filter parameter; for example: the electronic device finds a matched mapping item morning, winter and sunny according to the obtained time 9 A.M. on April first, 2010, winter and sunny, and the filter parameter corresponding to the matched mapping item includes values of a toner, saturation and brightness, which are a, b and c respectively;

after the filter parameter is obtained, the electronic device obtains the first image, may call the camera of the electronic device to shoot the first image, or may select the first image from images stored by the electronic device; and after the first image is obtained, the electronic device performs filter addition on the first image on the basis of the obtained value of the filter parameter, that is, a toner of the first image is adjusted to value a, saturation is adjusted to value b and brightness is adjusted to value c.

Application Scenario 2

In application scenario 2, when an electronic device adds a filter to a first obtained image, a value of a filter parameter adapted to position information is selected according to the current position information of the electronic device, and the selected filter parameter acts on the first image. A filter addition process is described as follows:

at first, the electronic device obtains a first instruction of adding the filter to the first image, the first instruction being generated by triggering a function button on a corresponding operation interface of an image processing tool by a user of the electronic device; the first image may be an image shot by a camera of the electronic device, or may be an image pre-stored in the electronic device; if the filter is to be added to the image shot by the camera, the first instruction may be obtained before the image is shot, or may be obtained after the image is shot, that is, the user may trigger generation of the first instruction before the image is shot, or may trigger generation of the first instruction after the image is shot;

after the first instruction is obtained, the electronic device obtains the current position information of the electronic device on the basis of own GPS function, and the position information may be information of a city where the electronic device is currently positioned;

after the information of the city where the electronic device is currently positioned is obtained, the electronic device requests a server for time, season and weather of the corresponding city, and it is supposed that the obtained time is 9 A.M. on April first, 2010, the season is winter and the weather is sunny; or, of course, if the electronic device has stored the time, season and weather of the corresponding city, the electronic device may not be required to obtain them from the server, and instead, may directly extract the stored time, season and weather of the corresponding city;

after the time, season and weather of the city where the electronic device is positioned are obtained, the electronic device may search a first mapping for a value of the matched filter parameter; for example: the electronic device finds a matched mapping item morning, winter and sunny according to the obtained time 9 A.M. on April first, 2010, winter and sunny, and the filter parameter corresponding to the matched mapping item includes values of a toner, saturation and brightness, which are a, b and c respectively;

after the value of the filter parameter is obtained, the electronic device further obtains temperature and ultraviolet intensity of the city where the electronic device is currently positioned, and it is supposed that the obtained temperature is 40□ and an ultraviolet intensity level is high; the electronic device searches a second mapping for a value of a matched filter parameter regulation factor according to the obtained temperature and ultraviolet intensity; for example:

the electronic device finds a matched mapping item temperature 35☐ ~40☐ and high ultraviolet intensity level according to the temperature of 40☐ and the high ultraviolet intensity level, and the filter parameter regulation factor corresponding to the matched mapping item includes toner, saturation and brightness regulation factors; and after the toner, saturation and brightness regulation factors are obtained, a value of the filter parameter obtained by searching the first mapping is adjusted by virtue of the regulation factors, and filter addition is performed on the first image on the basis of the adjusted value of the filter parameter.

Figure 7:
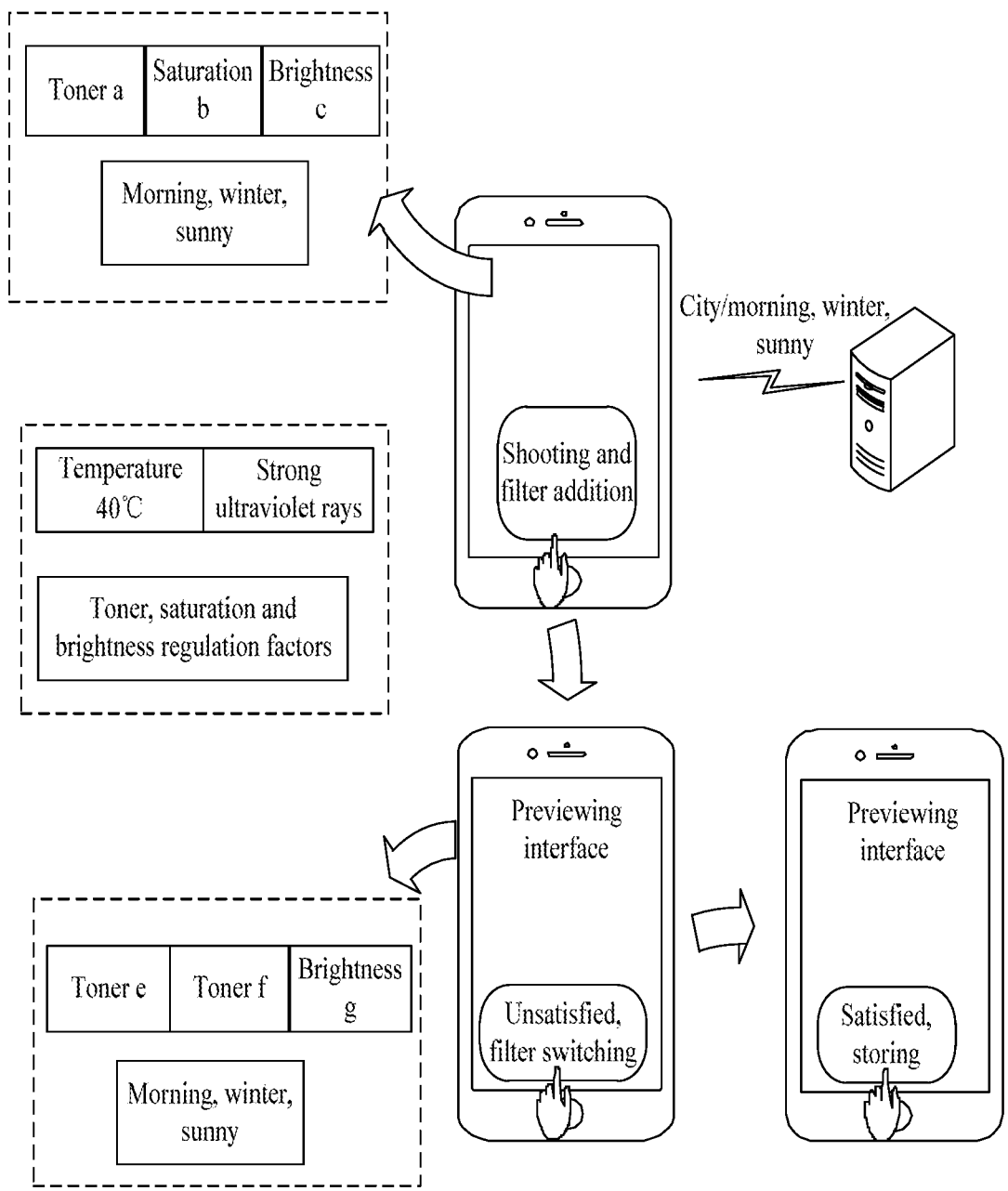
FIG. 7 is another optional application scenario diagram of an image processing method according to an embodiment of the disclosure.

It is noted that in application scenarios 1 and 2, after the electronic device displays an effect of the image subjected to filter addition to the user, if the user is unsatisfied with the display effect of the image added with the filter through a previewing interface, the electronic device may be triggered to generate a second instruction to perform filter switching; and for example, referring to FIG. 7, the electronic device obtains a value of a filter switching parameter after obtaining the second instruction indicating switching of the filter of the first image, performs filter switching on the first image added with the filter on the basis of the obtained value of the filter switching parameter, namely adjusts a value of a filter parameter of the first image into a value of the filter switching parameter, and finally displays a first image obtained under the action of the filter switching parameter. The filter switching parameter may be obtained by selecting a group from filter parameters pre-stored by the electronic device as filter switching parameters, or the user may input a group of filter switching parameters through the operation interface of the image processing tool.

In application scenarios 1 and 2 of the embodiment of the disclosure, a filter effect adapted to the environment may be automatically added to the first obtained image according to information such as the time, season and weather of the geographical position of the user, so that complexity in user operation for filter addition operation is greatly reduced.

Application Scenario 3

In application scenario 3, when an electronic device adds a filter to a first obtained video, a value of a filter parameter adapted to voice information is selected according to the voice information acquired by the electronic device, and the selected filter parameter acts on the first video. A filter addition process is described as follows:

at first, the electronic device obtains a first instruction of adding the filter to the first video, the first instruction being generated by triggering a function button on a corresponding operation interface of an image processing tool by a user of the electronic device; the first video may be a video shot by a camera of the electronic device, or may be a video stored in the electronic device; if the filter is to be added to the video shot by the camera, the first instruction may be obtained before the video is shot, or may be obtained after the video is shot, that is, the user may trigger generation of the first instruction before the video is shot, or may trigger generation of the first instruction after the video is shot;

after the first instruction is obtained, the electronic device executes operation of acquiring the voice information, performs voice recognition on the acquired voice information, and obtains text information corresponding to the voice information; for example, the text information obtained by voice recognition is "happy";

after the text information is obtained, the electronic device searches a first mapping for a value of a matched filter parameter; for example: the electronic device finds a matched mapping item "happy" according to the obtained text information "happy", and the filter parameter corresponding to the matched mapping item includes values of a toner, saturation and brightness, which are a, b and c respectively;

after the filter parameter is obtained, the electronic device obtains the first video, may call the camera of the electronic device to shoot the first video, or may select the first video from videos stored by the electronic device; and after the first video is obtained, the electronic device performs filter addition on the first video on the basis of the obtained value of the filter parameter, that is, toners of images of each frame in the first video are adjusted to value a, saturation is adjusted to value b and brightness is adjusted to value c.

Application Scenario 4

Figure 8:
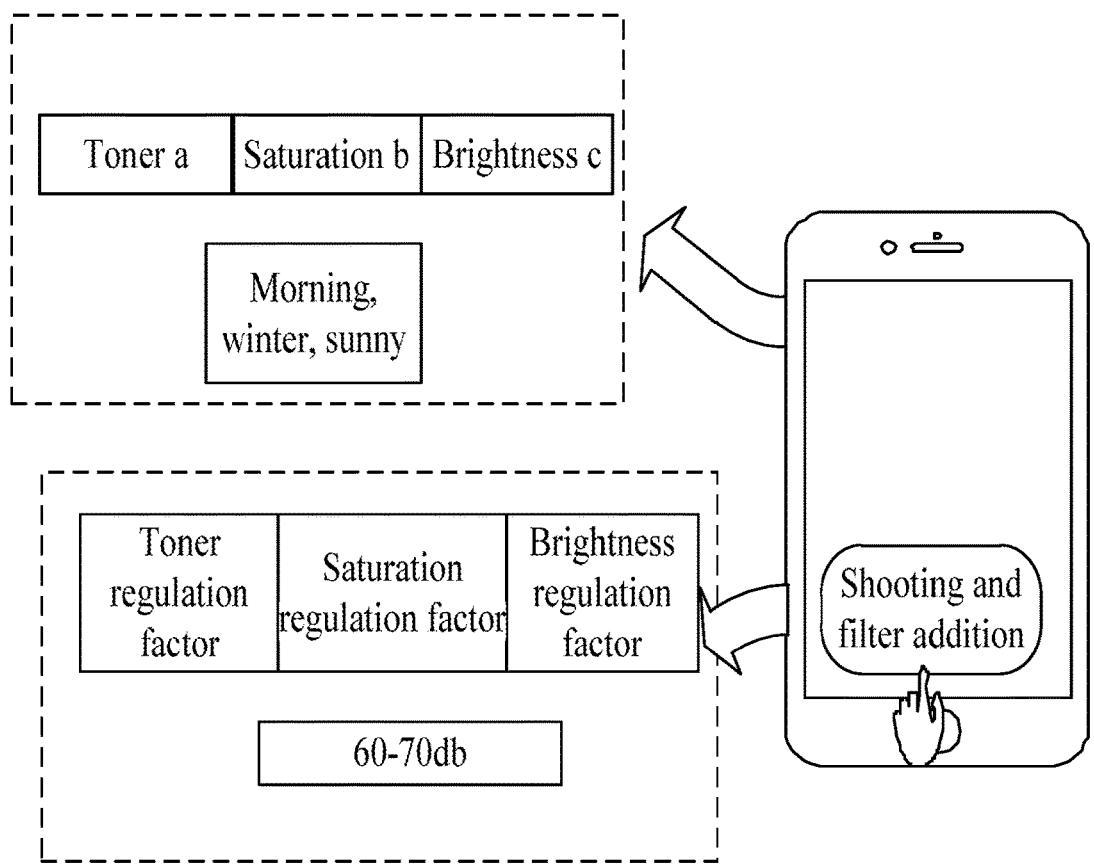
FIG. 8 is another optional application scenario diagram of an image processing method according to an embodiment of the disclosure.

In application scenario 4, when an electronic device adds a filter to a first obtained video, a value of a filter parameter adapted to voice information is selected according to the voice information acquired by the electronic device, and the selected filter parameter acts on the first video. A filter addition process is described as follows:

at first, the electronic device obtains a first instruction of adding the filter to the first video, the first instruction being generated by triggering a function button on a corresponding operation interface of an image processing tool by a user of the electronic device; the first video may be a video shot by a camera of the electronic device, or may be a video stored in the electronic device; if the filter is to be added to the video shot by the camera, the first instruction may be obtained before the video is shot, or may be obtained after the video is shot, that is, the user may trigger generation of the first instruction before the video is shot, or may trigger generation of the first instruction after the video is shot;

after the first instruction is obtained, the electronic device executes operation of acquiring the voice information, performs voice recognition on the acquired voice information, referring to FIG. 8, obtains text information corresponding to the voice information, and extracts an emotional state of the user, such as "happy", from the text information;

after the emotional state of the user is obtained, the electronic device searches a first mapping for a value of a matched filter parameter; for example: the electronic device finds a matched mapping relationship item "happy" according to the obtained emotional state "happy", and the filter parameter corresponding to the matched mapping relationship item includes values of a toner, saturation and brightness, which are a, b and c respectively;

after the value of the filter parameter is obtained, the electronic device further obtains a decibel level of the voice information of the user, and searches a second mapping for a value of a matched filter parameter regulation factor; for example: the electronic device finds a matched mapping item 60~70 db according to the decibel level (such as 70 db) of the voice information, and the filter parameter regulation factor corresponding to the matched mapping relationship item includes toner, saturation and brightness regulation factors; and after the toner, saturation and brightness regulation factors are obtained, a numerical value of the obtained filter parameter obtained by searching the first mapping relationship is adjusted by virtue of the regulation factors, and filter addition is performed on the first video on the basis of the adjusted value of the filter parameter.

Figure 9:
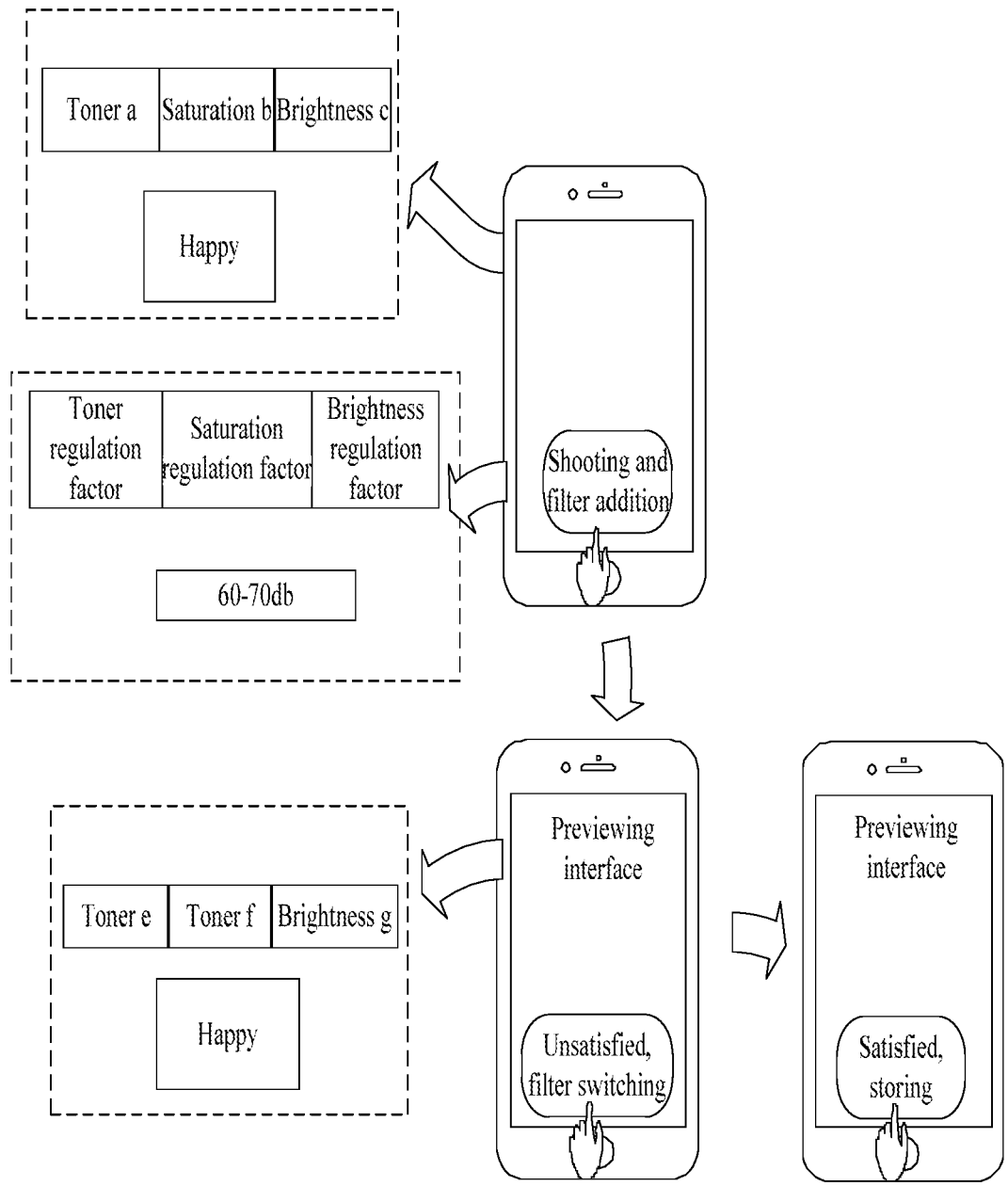
FIG. 9 is another optional application scenario diagram of an image processing method according to an embodiment of the disclosure.

It is noted that in application scenarios 3 and 4, referring to FIG. 9, after the electronic device displays an effect of the video subjected to filter addition to the user through the previewing interface, if the user is unsatisfied with the display effect, the electronic device may be triggered to generate a second instruction to perform filter switching; and for example, the electronic device obtains a value of a filter switching parameter after obtaining the second instruction of switching of the filter of the first video, performs filter switching on the first video added with the filter on the basis of the obtained value of the filter switching parameter, namely adjusts a value of a filter parameter of the first video into a value of the filter switching parameter, and finally displays a first video obtained under the action of the filter switching parameter. The filter switching parameter may be obtained by selecting a group from filter parameters pre-stored by the electronic device as filter switching parameters, or the user may input a group of filter switching parameters through the operation interface of the image processing tool.

In application scenarios 3 and 4 of the embodiment of the disclosure, a filter effect required by the user may be automatically added to the first obtained video according to the voice information acquired by the electronic device, so that complexity in user operation for filter addition operation is greatly reduced.

The embodiment of the disclosure provides an electronic device, an optional hardware structure diagram of the electronic device is shown in FIG. 1, and an image processing method recorded by the embodiment of the disclosure may be arranged in the electronic device.

The embodiment of the disclosure provides a computer-readable medium, which may be a Read-Only Memory (ROM) (such as a ROM, a FLASH memory and a transfer device), a magnetic storage medium (such as a magnetic tape and a disk drive), an optical storage medium (such as a Compact Disc Read-Only Memory (CD-ROM), a Digital Video Disk Read-Only Memory (DVD-ROM), a paper card and a paper tape) and program memories of other familiar types; a computer-executable instructions are stored in the computer-readable medium, and the instructions are executed to cause at least one processor to execute the following operation of: obtaining a first instruction of a filter to a target image; obtaining information of an environment where an electronic device is positioned, and obtaining a value of a first parameter on the basis of the information of the environment; searching, according to the value of the first parameter, a first preset mapping between different values of the first parameter and different values of a filter parameter to obtain a value of the filter parameter matched with the value of the first parameter according to the value of the first parameter; and performing filter addition on the target image on the basis of the obtained value of the filter parameter.

Optionally, the instruction is also executed to cause the at least one processor to execute the following operation of: extracting position information of the electronic device in the environment from the information of the environment; and requesting a server for a value of at least one of the following first parameters related to the position information: season, weather and time.

Optionally, the instruction is also executed to cause the at least one processor to execute the following operation of: searching the first mapping according to the searched out value of the first parameter related to the position information; obtaining the value of the at least one of the following filter parameters matched with the value of the first parameter: toner, saturation, brightness and contrast; and adjusting the value of at least one filter parameter of the target image to be consistent with the value of the matched at least one filter parameters.

Optionally, the instruction is also executed to cause the at least one processor to execute the following operation of: extracting voice information of a user in the environment from the information of the environment, and performing voice recognition on the voice information to obtain text information corresponding to the voice information; and extracting the value of the first parameter representing an emotional state of the user from the text information.

Optionally, the instruction is also executed to cause the at least one processor to execute the following operation of: searching the first preset mapping according to the value of the first parameter representing the emotional state of the user; obtaining the value of at least one of the following filter parameters matched with the value of the first parameter representing the emotional state of the user: the toner, the saturation, the brightness and the contrast; and adjusting the value of the at least one filter parameter of the target image to be consistent with the value of the matched at least one filter parameters.

Optionally, the instruction is also executed to cause the at least one processor to execute the following operation of: obtaining a value of a second parameter on the basis of the information of the environment where the electronic device is positioned; searching, according to the value of the second parameter, a second preset mapping between different values of the second parameter and different values of a filter parameter regulation factor for a value of a filter parameter regulation factor matched with the value of the second parameter; adjusting a value of the filter parameter matched with the first parameter on the basis of the searched out value of the filter parameter regulation factor; and performing filter addition on the target image on the basis of the adjusted value of the filter parameter.

Optionally, the instruction is also executed to cause the at least one processor to execute the following operation of: searching the second mapping relationship according to the value of the second parameter related to the position information of the electronic device in the environment, the second parameter including at least one of: a position of the sun, a position of the moon and the weather; and obtaining at least one of the following filter parameter regulation factors matched with the value of the second parameter: a toner regulation factor, a saturation regulation factor, a brightness regulation factor and a contrast regulation factor.

Optionally, the instruction is also executed to cause the at least one processor to execute the following operation of: searching the second mapping for the value of at least one of the following filter parameter regulation factors matched with the value of the second parameter: the toner regulation factor, the saturation regulation factor, the brightness regulation factor and the contrast regulation factor, according to the value of the second parameter representing a decibel level of the voice information of the user in the environment.

Optionally, the instruction is also executed to cause the at least one processor to execute the following operation of: obtaining a second instruction of switching of the filter of the target image; and obtaining a value of a filter switching parameter, and performing filter switching on the target image added with the filter on the basis of the obtained value of the filter switching parameter.

Those skilled the art should know that the embodiment of the disclosure may be provided as a method, a system or a computer program product. Therefore, the disclosure may adopt a form of pure hardware embodiment, pure software embodiment and combined software and hardware embodiment. Moreover, the disclosure may adopt a form of computer program product implemented on one or more computer-available storage media (including, but not limited to, a disk memory, a CD-ROM and an optical memory) including computer-available program codes.

The disclosure is described with reference to flowcharts and/or block diagrams of the method, equipment (system) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may further be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

The above are only some preferred embodiments of the disclosure and are not intended to limit the scope of patent of the disclosure.

What is claimed is:

1. An image processing method, applied in an electronic device, the method comprising:
   obtaining a first instruction of adding a filter to a target image;
   obtaining information of an environment where the electronic device is positioned, and obtaining a value of a first parameter on the basis of the information of the environment;
   searching, according to the value of the first parameter, a first preset mapping between different values of the first parameter and different values of a filter parameter for a value of the filter parameter matched with the value of the first parameter; and
   performing filter addition on the target image on the basis of the searched out value of the filter parameter;
   wherein obtaining the value of the first parameter on the basis of the information of the environment comprises:
   extracting voice information of a user in the environment from the information of the environment, and performing voice recognition on the voice information to obtain text information corresponding to the voice information; and
   extracting the value of the first parameter representing an emotional state of the user from the text information.

2. The image processing method according to claim 1, wherein obtaining the value of the first parameter on the basis of the information of the environment comprises:
   extracting position information of the electronic device in the environment from the information of the environment; and
   requesting a server for a value of at least one of the following first parameters related to the position information: season, weather and time.

3. The image processing method according to claim 2, wherein searching, according to the value of the first parameter, the first preset mapping between the different values of the first parameter and the different values of the filter parameter for the value of the filter parameter matched with the value of the first parameter comprises:
   searching the first mapping according to the obtained value of the first parameter related to the position information; and
   obtaining a value of at least one of the following filter parameters matched with the value of the first parameter: toner, saturation, brightness and contrast, and
   wherein performing filter addition on the target image on the basis of the searched out value of the filter parameter comprises:
   adjusting the value of at least one filter parameter of the target image to be consistent with the value of the matched at least one filter parameter.

4. The image processing method according to claim 1, wherein searching, according to the value of the first parameter, the first preset mapping between the different values of the first parameter and the different values of the filter parameter for the value of the filter parameter matched with the value of the first parameter comprises:
   searching the first preset mapping according to the value of the first parameter representing the emotional state of the user;
   obtaining the value of at least one of the following filter parameters matched with the value of the first parameter representing the emotional state of the user: toner, saturation, brightness and contrast; and
   performing filter addition on the target image on the basis of the obtained value of the at least one filter parameter comprises:
   adjusting the value of the at least one filter parameter of the target image to be consistent with the value of the matched at least one filter parameter.

5. The image processing method according to claim 1, further comprising:
   obtaining a value of a second parameter on the basis of the information of the environment where the electronic device is positioned;
   searching, according to the value of the second parameter, a second preset mapping between different values of the second parameter and different values of a filter parameter regulation factor for a value of a filter parameter regulation factor matched with the value of the second parameter; and
   adjusting a value of the filter parameter matched with the first parameter on the basis of the searched out value of the filter parameter regulation factor, and
   performing filter addition on the target image on the basis of the searched out value of the filter parameter comprises:
   performing filter addition on the target image on the basis of the adjusted value of the filter parameter.

6. The image processing method according to claim 5, wherein searching, according to the value of the second parameter, the second preset mapping between the different values of the second parameter and the different values of the filter parameter regulation factor for the value of the filter parameter regulation factor comprises:

searching the second mapping according to the value of the second parameter related to the position information of the electronic device in the environment, the second parameter comprising at least one of: a position of the sun, a position of the moon and the weather; and obtaining a value of at least one of the following filter parameter regulation factors matched with the value of the second parameter: a toner regulation factor, a saturation regulation factor, a brightness regulation factor and a contrast regulation factor.

7. The image processing method according to claim 5, wherein searching, according to the value of the second parameter, the second preset mapping between the different values of the second parameter and the different values of the filter parameter regulation factor for the value of the filter parameter regulation factor comprises:

searching the second mapping for a value of at least one of the following filter parameter regulation factors matched with the value of the second parameter: a toner regulation factor, a saturation regulation factor, a brightness regulation factor and a contrast regulation factor, according to the value of the second parameter representing a decibel level of the voice information of the user in the environment.

8. The image processing method according to claim 1, further comprising:

obtaining a second instruction of switching the filter of the target image; and obtaining a value of a filter switching parameter, and performing filter switching on the target image added with the filter on the basis of the obtained value of the filter switching parameter.

9. An electronic device, comprising:
a processor; and
a memory for storing instructions executable by the processor,
wherein the processor is configured to:
obtain a first instruction, of adding a filter to a target image;
obtain information of an environment where the electronic device is positioned;
obtain a value of a first parameter on the basis of the information of the environment, and search, according to the value of the first parameter, a first preset mapping between different values of the first parameter and different values of a filter parameter for a value of the filter parameter matched with the value of the first parameter; and
perform filter addition on the target image on the basis of the searched out value of the filter parameter;
wherein in order to obtain the value of the first parameter on the basis of the information of the environment, the processor is configured to:
extract voice information of a user in the environment from the information of the environment, and perform voice recognition processing on the voice information to obtain text information corresponding to the voice information; and
extract the value of the first parameter representing an emotional state of the user from the text information.

10. The electronic device according to claim 9, wherein in order to obtain the value of the first parameter on the basis of the information of the environment, the processor is configured to:

extract position information of the electronic device in the environment from the information of the environment; and request a server for a value of at least one of the following first parameters related to the position information: season, weather and time.

11. The electronic device according to claim 10, wherein in order to search, according to the value of the first parameter, the first preset mapping between the different values of the first parameter and the different values of the filter parameter for the value of the filter parameter matched with the value of the first parameter, the processor is configured to:

search the first mapping according to the value of the first parameter; and obtain a value of at least one of the following filter parameters matched with the first parameter: toner, saturation, brightness and contrast, is obtained; and adjusting the value of at least one filter parameter of the target image to be consistent with the value of the matched at least one filter parameter.

12. The electronic device according to claim 9, wherein in order to search, according to the value of the first parameter, the first preset mapping between the different values of the first parameter and the different values of the filter parameter for the value of the filter parameter matched with the value of the first parameter, the processor is specifically configured to:

search the first preset mapping according to the value of the first parameter representing the emotional state of the user; and obtain the value of at least one of the following filter parameters matched with the value of the first parameter representing the emotional state of the user: toner, saturation, brightness and contrast, and wherein in order to perform filter addition on the target image on the basis of the obtained value of the at least one filter parameter, the processor is configured to:
adjust the value of the at least one filter parameter of the target image to be consistent with the value of the matched at least one filter parameter.

13. The electronic device according to claim 9, wherein the processor is further configured to:

obtain a value of a second parameter on the basis of the information of the environment where the electronic device is positioned;

obtain a value of a filter parameter regulation factor matched with the value of the second parameter; and adjust a value of the filter parameter matched with the first parameter on the basis of the obtained value of the filter parameter regulation factor; and perform filter addition on the target image on the basis of the adjusted value of the filter parameter.

14. The electronic device according to claim 13, wherein in order to search, according to the value of the second parameter, the second preset mapping between the different values of the second parameter and the different values of the filter parameter regulation factor for the value of the filter parameter regulation factor, the processor is configured to:

search the second mapping according to the value of the second parameter related to the position information of the electronic device in the environment, the second parameter comprising at least one of: a position of the sun, a position of the moon and weather, and obtain a value of at least one of the following filter parameter regulation factors matched with the value of the second parameter: a toner regulation factor, a saturation regulation factor, a brightness regulation factor and a contrast regulation factor.

15. The electronic device according to claim 13, wherein in order to search, according to the value of the second parameter, the second preset mapping between the different values of the second parameter and the different values of the filter parameter regulation factor for the value of the filter parameter regulation factor, the processor is configured to:

search the second mapping for a value of at least one of the following filter parameter regulation factors matched with the value of the second parameter: a toner regulation factor, a saturation regulation factor, a brightness regulation factor and a contrast regulation factor, according to the value of the second parameter representing a decibel level of the voice information of the user in the environment.

16. The electronic device according to claim 9, wherein the processor is further configured to:

obtain a second instruction of switching the filter of the target image; and obtain a value of a filter switching parameter, and perform filter switching on the target image added with the filter on the basis of the obtained value of the filter switching parameter.

17. A non-transitory computer storage medium, in which executable instructions are stored, the executable instructions being configured to execute the image processing method comprising following steps:

obtaining a first instruction of adding a filter to a target image;

obtaining information of an environment where the electronic device is positioned, and obtaining a value of a first parameter on the basis of the information of the environment;

searching, according to the value of the first parameter, a first preset mapping between different values of the first parameter and different values of a filter parameter for a value of the filter parameter matched with the value of the first parameter; and performing filter addition on the target image on the basis of the searched out value of the filter parameter;

wherein obtaining the value of the first parameter on the basis of the information of the environment comprises:

extracting voice information of a user in the environment from the information of the environment, and performing voice recognition on the voice information to obtain text information corresponding to the voice information; and extracting the value of the first parameter representing an emotional state of the user from the text information.

* * * * *